United States Patent [19]

Hess et al.

[11] 3,962,076
[45] June 8, 1976

[54] PROCESS FOR CONVERTING AQUEOUS SEWAGE TO POTABLE WATER

[75] Inventors: Howard V. Hess, Glenham; William F. Franz, Gardiner; Edward L. Cole, Fishkill, all of N.Y.

[73] Assignee: Texaco Inc., New York, N.Y.

[22] Filed: Sept. 11, 1974

[21] Appl. No.: 505,127

Related U.S. Application Data

[63] Continuation-in-part of Ser. No. 304,160, Nov. 6, 1972, Pat. No. 3,876,538.

[52] U.S. Cl. .......................... 210/22 R; 210/63 R; 210/71; 210/73 S; 210/83; 210/175; 210/513; 201/25
[51] Int. Cl.² ........................................ B01D 11/00
[58] Field of Search ................... 210/21, 22, 63, 83, 210/175, 513; 201/2.5, 20, 25

[56] References Cited
UNITED STATES PATENTS

| | | | |
|---|---|---|---|
| 3,308,063 | 3/1967 | Hess et al. | 210/21 |
| 3,591,449 | 7/1971 | Hess et al. | 210/63 |
| 3,607,619 | 9/1971 | Hess et al. | 210/63 |
| 3,876,497 | 4/1975 | Hoffman | 210/63 X |
| 3,876,538 | 4/1975 | Hess et al. | 210/21 |

*Primary Examiner*—John Adee
*Assistant Examiner*—Ferris H. Lander
*Attorney, Agent, or Firm*—T. H. Whaley; C. G. Ries; Henry W. Archer

[57] ABSTRACT

Disclosed herein is a process for disposing of aqueous sewage and for producing fresh water by coking the sewage in the liquid phase to form gases, coke and an effluent which is extracted with a hot liquid hydrocarbon to form a hydrocarbon-water solution and a hot concentrated brine. The hot brine is injected into the sewage sludge to heat same to coking temperature. Hot water is removed from the hydrocarbon-water solution, used for space heating or the like and thereby cooled. The cool water then is passed through a carbon absorber to remove traces of hydrocarbon dissolved therein, and chlorinated to give potable water.

10 Claims, 1 Drawing Figure

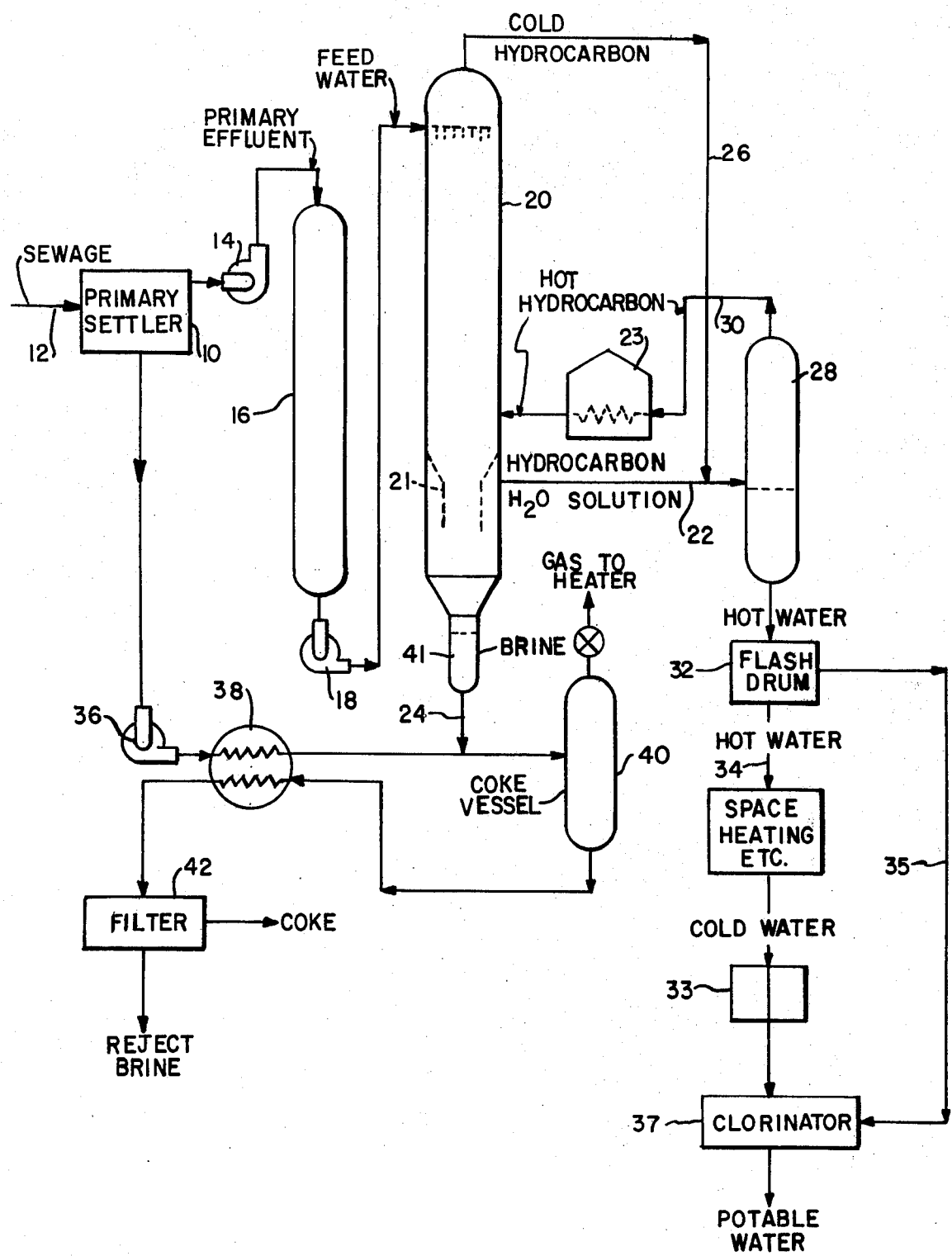

PROCESS FOR CONVERTING AQUEOUS SEWAGE TO POTABLE WATER

CROSS-REFERENCE TO CO-PENDING APPLICATION

This application is a continuation-in-part of coassigned patent application Ser. No. 304,160, filed Nov. 6, 1972; now U.S. Pat. No. 3,876,538.

BACKGROUND OF THE INVENTION

1. Field of the Invention

This invention relates to a novel process for disposing of sewage and for recovering potable water therefrom. This process is particularly adapted for supplying water to areas where supply thereof is limited and where the water contains average or greater than average amounts of dissolved minerals.

2. Description of the Prior Art

The prior art to which this invention relates already is aware, inter alia, of coassigned U.S. Pat. No. 3,308,063 issued Mar. 7, 1966. The process described therein involves extracting water from salt water or brine by means of a hot hydrocarbon liquid characterized by its ability to extract more water from brine at a higher than at a lower temperature. The hot concentrated rejected brine containing as much as 10-20% salt is discharged and not used further in the process.

Coassigned patent application Ser. No. 304,160, filed Nov. 6, 1972 discloses a process for disposing of aqueous sewage and for producing fresh water by coking sewage in the liquid phase to form gases, coke and an effluent which is extracted with a hot liquid hydrocarbon to form a hydrocarbon-water solution and a concentrated brine. Cooling of the hydrocarbon-water solution results in the formation of distinct hydrocarbon and water phases which can be separated by gravity.

SUMMARY OF THE INVENTION

The present invention is a process for disposing of aqueous sewage and for producing fresh water by coking the sewage in the liquid phase to form gases, coke and an effluent which is extracted with a hot liquid hydrocarbon to form a hydrocarbon-water solution and a hot concentrated brine. The hot brine is injected into the sewage sludge to heat the same to coking temperature.

BRIEF DESCRIPTION OF THE DRAWING

The present inventive concept will be more readily understood upon consideration of the accompanying drawing which is a flow diagram of one arrangement for carrying out the process of this invention.

DISCLOSURE

Referring to the drawing, sewage is collected through a conventional sewage collection setup (not shown) and passes through a bar screen and grit chamber to remove trash and sand, and then through a comminuter and finally into a primary settler 10 via line 12. In the primary settler the primary sludge (about 5%) settles to the bottom and consists of a pumpable slurry with a chemical oxygen demand of some 60,000 mg/$O_2$/liter. The effluent from the top of the primary settler (~95%) can have a COD of about 125 mg/$O_2$/liter (these COD figures taken from the primary settler at the Beacon, N.Y. plant) and dissolved and non-settleable mineral solids of some 300 mg/liter (ppm). In the flow, the effluent from the top of the primary settler is pumped by pump 14 to carbon absorber 16 whereby the dissolved organic compounds are removed by adsorption on activated carbon. This carbon can be prepared from coke produced elsewhere in the process. The stream from the carbon adsorber system (say at 70°F) is picked up by high pressure pump 18 and pumped up to extraction pressure at about 2000 psi and sparged into the top of desalting vessel 20, which is a heat exchanger and extraction tower. Vessel 20 is equipped with a trap tray 21 which for isolating the hydrocarbon-water solution and with a boot 41 where the insoluble brine collects.

Hot hydrocarbon (about 600°F and 2000 psi) enters the vessel 20 above the trap tray.

The operating pressure of the extraction step must be sufficiently high to maintain both the brine and the hydrocarbon in a liquid condition at the operating temperature, normally greater than 1000 psig and sometimes as high as 3000 psig. Usually the phase break and separation part of the system is at the same operating pressure.

The upper temperature limit should be below the temperature at which vaporization can occur in the extractor to ensure that the fluids in the system are in liquid phase.

Normally liquid hydrocarbons are generally suitable for use in the process of this invention. Hydrocarbons and mixtures of hydrocarbons containing from 6 to 30 carbon atoms per molecule may be used. Hydrocarbons of 8 to 20 carbon atoms, particularly, 9 to 12, per molecule are preferred. Various petroleum fractions including kerosene, naphtha, odorless spirits, gasoline, and lubricating oils may be used in the process of the present invention. Pure hydrocarbons which may be used either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; naphthenic hydrocarbons, e.g., methylcyclopentane, cyclohexane, methylcyclohexane, dimethylcyclohexane, cyclohexene, pinene, etc.; and aromatic hydrocarbons, e.g., benzene, cumene, xylenes, methylnaphthalenes, etc.

Preferred petroleum fractions useful in the present process including normal paraffin hydrocarbons containing 10 to 12 carbon atoms per molecule; isoparaffin hydrocarbons of 12 carbon atoms per molecule, e.g., the bottoms fraction obtained from alkylation of butylenes with isobutane; Udex extract, an aromatic hydrocarbon fraction consisting essentially of hydrocarbons of 9 to 10 carbon atoms per molecule obtained on extraction of petroleum naphtha with a mixture of diethylene glycol and water; propylene tetramer; gasoline fraction hydrocarbons of 10 to 12 carbon atoms per molecule; and naphthenes containing 9 to 10 carbon atoms per molecule.

This hot hydrocarbon serves to heat the water feed from 70°F. to extraction temperature of 600°F as the water is sparged downward into direct counter-current contact through the rising hot hydrocarbon stream, a hydrocarbon-water solution is produced which is continuously removed through line 22. Brine collects in the brine boot and is continuously removed through line 24 around at 600°F and 2000 psi. Cold hydrocarbon (at about 90°F and 2000 psi) is removed from the top of vessel 20 through line 26.

The temperature and pressure considerations in vessel 20 are set so that at extraction conditions (about 600°F – 2000 psi) a 50-50 volume ratio exists in the hydrocarbon-water solution. Two volumes of hot hydrocarbon are fed to the vessel for every incoming 1.05 volumes of water entering at the top of the vessel. One volume of cold hydrocarbon passes from the top of the vessel and two volumes of the hot hydrocarbon-water solution pass from line 22. The brine reject from the boot is at the rate of 0.05 volumes.

The hot hydrocarbon water solution flowing in line 22 (2 volumes) is combined with the cold hydrocarbon flowing in line 26 (one volume) and the temperature of the combined stream becomes 430°F which is sufficiently low to cause a phase separation and then in separator 28 the water phase and the hydrocarbon phase are separated. The hydrocarbon from separator 28 (430°F) passes through line 30, to heater 23 where the temperature is raised to 600°F before returning to vessel 20.

The hot water from separator 28 (430°F) is passed to flash drum 32 where 150 psi steam is generated. About 10% of the water is flashed and the energy used for power generation with the water finally being condensed, recycled by line 35 chlorinator 37 and used as potable water. The remainder of the water from the flash drum (line 34) is at about 350°F. This energy in this hot water can be used for space heating, air conditioning, greenhouse heating and the like. The resulting cool water then is passed through carbon absorber 33 to remove the traces of hydrocarbon which might be dissolved therein and then combined with water produced from the steam in chlorinator 37, chlorinated in known fashion, and used as potable water for a municipality.

Referring now to the treatment of the primary sludge accumulating in the bottom of the primary settler, the sludge (about 5 vol. % of the feed to the primary settler) is pumped by pump 36 up to system pressure (around 1100 psi). The sludge then is passed through heat exchanger 38 where it is in heat exchange with the hot coker effluent from coke drum 40. The incoming sludge is heated to 500°F in the heat exchanger and combined with hot reject brine from desalting vessel 4 at 600°F and the combined stream, now at 550°F passes to the coke drum 15 where 1–5 minutes residence time is provided. The effluent from the bottom of drum 40 passes through heat exchanger 38 then to a separating device 42 which may be a filter, cyclone, etc — and finally relatively cool reject brine stream and a coke product which may be activated to produce material for use in adsorbers 16 and 33. It may be burned in the heater 23, or it may be used as landfill, or, preferably, as a soil conditioner.

A small amount of gas is produced in the sewage coking reaction. This gas can be burned in heater 23.

In practice, assuming a municipality which has a total sewage flow of 1,000,000 gals per day, the following are produced:
  949,000 gallons per day of fresh water
  50,000 gallons per day of reject brine
  800 pounds per day of coke The water, after the energy has been extracted from it to generate power, space heating etc., and after chlorination is potable and suitable for recycle to a muncipality.

The brine is rejected and the make up volume to account for the brine reject may be supplied to the extraction system from either sea water or brackish water.

The coke can be used as fuel, activated to supply the needs of the activated carbon adsorption system or be used as soil conditioner. The operation of the present system differs from any of the other flows on waste disposal in that the hot brine rejected from the desalting vessel is used directly, by injection, to heat the primary sludge to coking temperature.

What is claimed is:

1. A process for converting aqueous sewage containing dissolved brine-forming minerals and organic compounds to potable water, and coke, comprising: separating said sewage into a primary sludge consisting of a pumpable slurry and a relatively cool primary effluent containing said minerals; passing said effluent into direct counter-current contact with relatively hot hydrocarbon liquid under a pressure of 1000 to 3000 psi in a contacting zone at a temperature between 600 and 700°F thereby forming a hydrocarbon minerals-free water solution, cooled hydrocarbon and a hot concentrated minerals containing brine solution; separating said hydrocarbon from said water; flashing at least a part of said water and condensing same for use as potable water; pressurizing said sludge to around 1000 to 3000 psi and injecting said hot brine into said sludge to coke said sludge in the liquid phase to form a reject coker effluent, gases and coke.

2. The process of claim 1 wherein said primary effluent is treated with activated carbon to remove organic compounds therefrom.

3. The process of claim 1 wherein two volumes of hot hydrocarbon are provided for each 1.05 volumes of primary effluent.

4. The process of claim 1, also comprising reheating said hydrocarbon following contact with said effluent and returning at least a part thereof to said contacting zone.

5. The process according to claim 1 comprising introducing said cool primary effluent into an upper portion of a vertically elongated contacting zone; introducing said hot hydrocarbon into an intermediate portion of said zone and withdrawing cooled hydrocarbon from the upper part of said zone above the point of introduction of said brine.

6. The process of claim 1 wherein said primary sludge is preheated to around 500°F. by heat exchange with said coker effluent.

7. The process of claim 1 wherein the major part of said separated water is put to use before final discharge thereof, combined with said condensed water and chlorinated.

8. The process of claim 1 wherein said hydrocarbon contains from 6 to 30 carbon atoms per molecule.

9. The process of claim 1 wherein that part of said water which has not been flashed has heat removed therefrom and contacted with activated carbon to remove traces of said hydrocarbon and then is chlorinated to produce potable water.

10. The process of claim 9 wherein said flashed water is condensed and combined with the unflashed part prior to chlorination.

* * * * *